United States Patent [19]

Bolenbaugh et al.

[11] 4,436,187

[45] Mar. 13, 1984

[54] DISC BRAKE ASSEMBLY

[75] Inventors: Daniel L. Bolenbaugh; John R. Wegh, both of South Bend, Ind.

[73] Assignee: The Bendix Corporation, Southfield, Mich.

[21] Appl. No.: 322,349

[22] Filed: Nov. 18, 1981

[51] Int. Cl.³ ............................................. F16D 55/224
[52] U.S. Cl. .................... 188/73.45; 403/155; 411/530
[58] Field of Search ............... 188/73.33, 73.34, 73.43, 188/73.44, 73.45; 403/154, 155, 378, 379; 411/530

[56] References Cited

U.S. PATENT DOCUMENTS

| | | | |
|---|---|---|---|
| 2,192,604 | 3/1940 | Painter | 24/261 R X |
| 2,661,228 | 12/1953 | Wilson | 403/155 |
| 2,954,991 | 10/1960 | Seiden | 403/379 X |
| 3,648,807 | 3/1972 | Lottridge et al. | 188/73.43 |
| 4,267,904 | 5/1981 | Belart | 188/73.45 |
| 4,310,076 | 1/1982 | Ikeda | 188/73.45 |

FOREIGN PATENT DOCUMENTS

| | | | |
|---|---|---|---|
| 677932 | 7/1939 | Fed. Rep. of Germany | 411/530 |
| 2284800 | 4/1976 | France | 188/73.43 |
| 47-49516 | 12/1972 | Japan | 188/73.43 |
| 354525 | 8/1931 | United Kingdom | 411/530 |

*Primary Examiner*—George E. A. Halvosa
*Attorney, Agent, or Firm*—Paul David Schoenle; Ken C. Decker

[57] ABSTRACT

A disc brake assembly includes a torque plate (14) with a radial portion (16) and an axial portion (18). The axial portion (18) defines a pair of arms (22,24) with slots (28,32) receiving pin assemblies (36,38). One of the pin assemblies defines a slot (60 or 62) and the torque plate (14) defines a slot (84) to releasably lock a spring (50) in engagement with the pin assembly (36).

2 Claims, 4 Drawing Figures

DISC BRAKE ASSEMBLY

The present invention relates to a disc brake assembly which includes a torque member with a pair of arms extending axially and radially relative to a rotor to be braked. The axially extending portions of the pair of arms include slots matching with caliper slots in order to retain pin assemblies therebetween and these pin assemblies carry the caliper for axial movement during braking.

In copending U.S. patent application Ser. No. 433,576, filed Oct. 12, 1982, which is a continuation of U.S. patent application Ser. No. 192,112, filed Sept. 29, 1980, now abandoned, in the name of Donald D. Johannesen, et al., a pair of keys or pin assemblies are disposed within matching slots between a caliper and a pair of torque member arms. One of the pin assemblies comprises a two part assembly with a wedge interface and a spring is coupled to each part to maintain the two parts together. If the spring should move away from its installed position, it is possible for the spring to come in contact with a rotating wheel whereupon the spring may be jarred loose from its engagement with the one pin assembly. Because the one pin assembly is maintained in its installed position by the spring, it is important that the spring remain in engagement with the one pin assembly.

It is an object of the present invention to avoid the foregoing problem of the spring contacting a wheel by providing structure on the one pin assembly and the torque member to maintain the spring in its installed position.

The present invention provides a disc brake assembly comprising a torque member disposed adjacent a rotor to be braked, the torque member including a pair of arms extending axially over the periphery of the rotor and circumferentially spaced from each other, a caliper assembly carried by the pair of arms via pin assemblies disposed within matching slots between the caliper assembly and each of the pair of arms, and a resilient member engageable with one of the pair of pin assemblies, characterized by said one pin assembly including means for preventing movement of said resilient member away from an installed position and said torque member includes means also preventing movement of said resilient member away from the installed position.

It is an advantage of the present invention that a double locking or positioning fit is provided for the resilient member so that if either the one pin slot or the torque member groove is insufficient to retain the spring in its installed position the remaining fit is sufficient to keep the resilient member away from the wheel.

Figure 1:
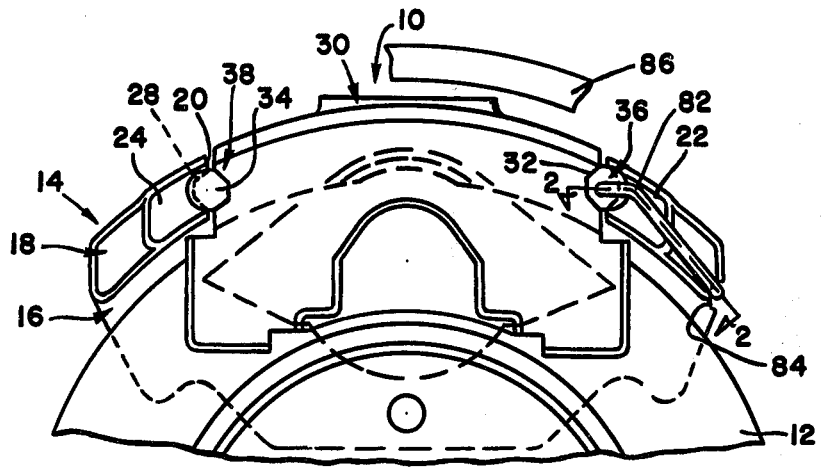
FIG. 1 is a front view of a disc brake assembly constructed in accordance with the present invention.

A disc brake assembly 10 for a rotor 12 to be braked includes a torque plate 14 with a radially extending portion 16 extending substantially parallel to the rotor 12 on one side thereof and an axially extending portion 18 overlapping the outer periphery of a segment of the rotor 12. The torque plate 14 defines a central opening 20 which separates a pair of arms 22 and 24 comprising the axially extending portion 18. The pair of arms 22 and 24 extend over the periphery of the rotor and define axially extending slots 26 and 28, respectively, which are three sided. A caliper assembly 30 is disposed within the central opening 20 and is also provided with matching slots 32 and 34 similar to the slots 26 and 28. When the caliper is disposed within the opening 20, the slots 32 and 34 align with the slots 26 and 28, respectively so that a pair of pin assemblies 36 and 38 fit within the matching slots to movably support the caliper assembly 30 relative to the torque plate 14 and the rotor 12. As disclosed in the foregoing U.S. patent application Ser. No. 192,112, the pin assembly 36 comprises a two part assembly with a wedging interface 40 shown in FIG. 2. The pin assembly 38 comprises a single part suitably retained within the matching slots 28, 34.

In accordance with the invention, a spring 50 cooperates with the pin assembly 36 to retain the latter within the space formed by the matching slots 26 and 32. The pin assembly 36 includes transversely extending flanges 52 and 54 which oppose opposite ends 56 and 58 of the arm 22. Each flange 52 and 54 forms a slot 60 and 62 which leads to a central hole 64 and 66. The spring 50 is substantially U-shaped with ends 70 and 72, legs 74 and 76 and a connecting part 78. The end 70 and 72 are biased by the resiliency of legs 74 and 76 to fit within the respective holes 64 and 66, while the legs 74 and 76 are biased to fit within the slots 60 and 62. Each leg 74 and 76 is formed with a bend 80 and 82 so that a trailing portion of the legs is directed to an axially extending groove 84 formed partially on the torque plate portion 16 and partially on the torque plate portion 18 of arm 22. The connecting part 78 is disposed within the axially extending groove 84 to prevent the spring 50 from pivoting about its ends to contact either the rotor 12 or the wheel assembly 86.

Figure 2:
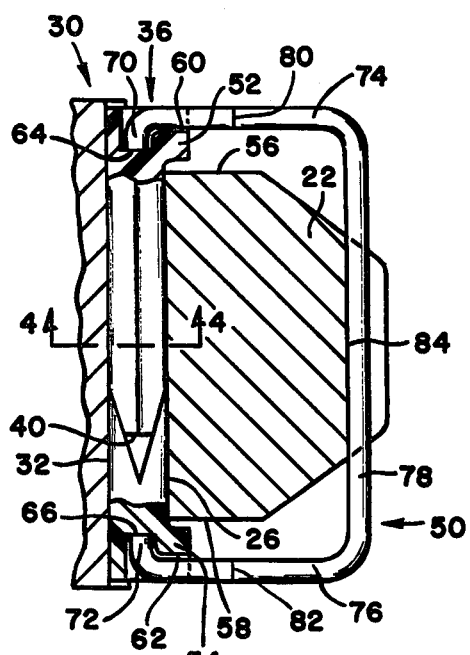
FIG. 2 is a cross sectional view taken along line 2—2 of FIG. 1.
Figure 4:
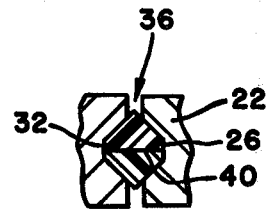
FIG. 4 is a cross sectional view taken along line 4—4 of FIG. 2.
Figure 3:
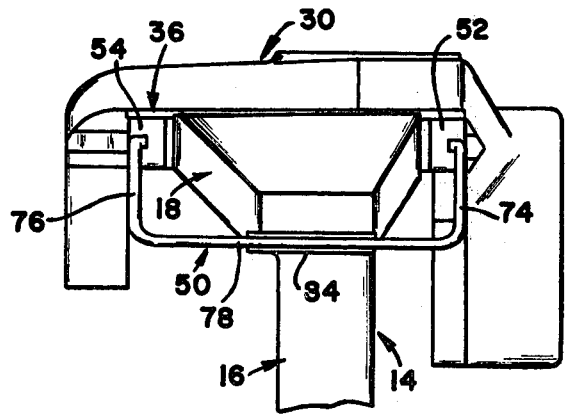
FIG. 3 is a right side view of FIG. 1.

In the uninstalled state, the spring ends 70 and 72 are closer together than what is illustrated in FIG. 2. When the spring 50 is assembled to the pin assembly 36 and the torque plate 14, the ends 70 and 72 are spread apart a distance substantially equal to the axial spacing between slots 60 and 62, the connecting part 78 is first disposed within groove 84 and the legs are aligned with the slots 60 and 62 so that the ends 70 and 72 can be released to fit within the respective holes 64 and 66. Consequently, the ends 70 and 72 bias the pin assembly parts together when the spring is installed.

With the spring 50 defining a locking fit with the torque plate groove 84 and also with the pin assembly slots 60 and 62, and spring is believed to be sufficiently attached to the disc brake assembly to prevent separation of the spring therefrom and also to keep the spring spaced from the rotor and wheel assembly. Even if the spring separates from groove 84, the pin assembly slots are rotatably fixed about the pin assembly longitudinal axis, so that the locking fit between the slots and legs 74 and 76 prevents the spring from rotating about the pin assembly longitudinal axis to engage either the wheel assembly or the rotor.

We claim:

1. A disc brake assembly comprising a torque member disposed adjacent a rotor to be braked, the torque member including a pair of arms extending axially over the periphery of the rotor and circumferentially spaced from each other, a caliper assembly carried by the pair of arms via nonrotatable pin assemblies disposed within matching, axially extending slots between the caliper assembly and each of the pair of arms, and a resilient member engageable with one of the pair of pin assemblies, characterized by said one pin assembly including a pin having a longitudinal axis and flanges extending radially from said axis defining slots leading to central holes formed along said axis at opposite ends of said pin, said resilient member including ends biased to fit within the respective holes and legs biased to fit within the respective slots, one of said pair of arms defining an axially extending groove opening away from the caliper, said resilient member including a connecting part extending between said legs and disposed within said axially extending groove, said one pin assembly slots defining a first locking fit with said resilient member to prevent rotation of the latter about one of the matching slots, said axially extending groove defining a second locking fit with said resilient member to also prevent rotation of the latter about said one matching slot, and said one pin assembly extending from the holes and slots to the axially extending groove while remaining radially inwardly of a radial outer dimension for said one arm.

2. The disc brake assembly of claim 1 in which said one arm includes a radially extending portion substantially parallel with the rotor and an axially extending portion defining said one arm matching slot, said axially extending groove intersecting said radially extending portion and said axially extending portion of said one arm.

* * * * *